United States Patent
Chahal et al.

(10) Patent No.: US 12,098,647 B2
(45) Date of Patent: Sep. 24, 2024

(54) POSITION SENSOR FOR VARIABLE VANE ASSEMBLY AND METHOD FOR CALIBRATING SAME

(71) Applicant: Pratt & Whitney Canada Corp., Longueuil (CA)

(72) Inventors: Jasraj Chahal, LaSalle (CA); Philippe Beauchesne-Martel, Brossard (CA); Sean McCarthy, Beaconsfield (CA)

(73) Assignee: Pratt & Whitney Canada Corp., Longueuil (CA)

( * ) Notice: Subject to any disclaimer, the term of this patent is extended or adjusted under 35 U.S.C. 154(b) by 238 days.

(21) Appl. No.: 17/719,037

(22) Filed: Apr. 12, 2022

(65) Prior Publication Data
US 2023/0323790 A1 Oct. 12, 2023

(51) Int. Cl.
*G01B 21/04* (2006.01)
*F01D 17/02* (2006.01)
*F01D 17/16* (2006.01)

(52) U.S. Cl.
CPC .......... *F01D 17/162* (2013.01); *F01D 17/02* (2013.01); *G01B 21/042* (2013.01); *F05D 2270/802* (2013.01); *F05D 2270/821* (2013.01)

(58) Field of Classification Search
CPC ...... F01D 17/162; F01D 17/02; F01D 21/003; G01B 21/042; F05D 2270/802; F05D 2270/821
USPC .......................................................... 324/202
See application file for complete search history.

(56) References Cited

U.S. PATENT DOCUMENTS

| | | | | |
|---|---|---|---|---|
| 2,784,935 A | * | 3/1957 | Cohen | F01D 17/06 415/23 |
| 5,044,880 A | * | 9/1991 | McKean | F01D 17/143 415/158 |
| 6,203,272 B1 | * | 3/2001 | Walsham | F01D 17/143 415/158 |
| 7,700,907 B2 | * | 4/2010 | Braun | F01D 21/003 73/1.28 |
| 8,528,207 B2 | * | 9/2013 | Lozier | F04D 27/0246 29/889.4 |
| 8,857,070 B2 | * | 10/2014 | Niederbremer | F04D 29/563 33/534 |

(Continued)

FOREIGN PATENT DOCUMENTS

EP 3586090 B1 2/2022

OTHER PUBLICATIONS

EP search report for EP23167606.5 dated Jul. 17, 2023.

*Primary Examiner* — Christopher P McAndrew
(74) *Attorney, Agent, or Firm* — Getz Balich LLC

(57) ABSTRACT

A method for calibrating a position sensor of a variable vane assembly for a gas turbine engine includes positioning an actuator member in at least one predetermined position, determining a first measured position of the actuator member in the at least one predetermined position with a first channel of a position sensor, determining a second measured position of the actuator member in the at least one predetermined position with a second channel of a position sensor, determining a measured position difference between the first measured position and the second measured position, and calibrating the second channel of the position sensor by adjusting the second measured position by the measured position difference to determine a second calibrated position.

15 Claims, 6 Drawing Sheets

(56) References Cited

U.S. PATENT DOCUMENTS

| | | | |
|---|---|---|---|
| 8,881,584 B2* | 11/2014 | Spanos | F04D 29/563 |
| | | | 73/112.01 |
| 10,132,189 B2 | 11/2018 | Henson | |
| 10,247,579 B2 | 4/2019 | Daniels | |
| 11,021,991 B2* | 6/2021 | Boudreau | F04D 27/002 |
| 2009/0108793 A1* | 4/2009 | Sanders | G05B 19/4062 |
| | | | 318/610 |
| 2009/0123272 A1 | 5/2009 | Love | |
| 2010/0119355 A1 | 5/2010 | Cox | |
| 2013/0084179 A1* | 4/2013 | Mantese | F01D 17/20 |
| | | | 416/31 |
| 2016/0273378 A1* | 9/2016 | Henson | F01D 17/14 |

* cited by examiner

POSITION SENSOR FOR VARIABLE VANE ASSEMBLY AND METHOD FOR CALIBRATING SAME

TECHNICAL FIELD

This disclosure relates generally to variable vane assemblies for gas turbine engines and more particularly to position sensors for variable vane assemblies.

BACKGROUND OF THE ART

Gas turbine engines, such as those used in aircraft applications, may frequently include variable guide vanes disposed in an inlet of a compressor or turbine section of the gas turbine engine. The positions of the variable guide vanes may be adjusted to control the airflow being directed to downstream components such as rotor blades. To properly control the position of the variable guide vanes during various gas turbine engine operating conditions, variable vane control systems need accurate information on the current positions of the variable guide vanes. Position sensors may be used to measure variable guide vane positions and provide the measured positions to the control systems. However, position sensor calibration can vary substantially, particularly for newly installed, replacement position sensors. Calibration procedures for position sensors are time consuming and include the risk of operator error resulting in improper calibration. Accordingly, what is needed are improved calibration systems and methods which address one or more of the above-discussed concerns.

SUMMARY

It should be understood that any or all of the features or embodiments described herein can be used or combined in any combination with each and every other feature or embodiment described herein unless expressly noted otherwise.

According to an aspect of the present disclosure, a variable vane assembly for a gas turbine engine includes a plurality of variable vanes disposed about an axial centerline. Each variable vane of the plurality of variable vanes is rotatable about a respective vane axis. The variable vane assembly further includes an actuator including an actuator member configured to rotate at least one variable vane of the plurality of variable vanes and a position sensor including a first position channel and a second position channel. The first position channel is configured to determine a first measured position of the actuator member and the second position channel is configured to determine a second measured position of the actuator member. The variable vane assembly further includes a controller in signal communication with the position sensor and the actuator. The controller includes memory having instructions stored therein which, when executed by the controller, cause the controller to determine the first measured position and the second measured position of the actuator member in at least one predetermined position of the actuator member, determine a measured position difference of the first measured position and the second measured position, and calibrate the second channel of the position sensor by adjusting the second measured position by the measured position difference to determine a second calibrated position.

In any of the aspects or embodiments described above and herein, the memory may have instructions stored therein which when executed by the controller, cause the controller to determine the first measured position, determine the second measured position, and determine the measured position difference automatically as the actuator moves from a first actuator position to a second actuator position. The at least one predetermined position may be located between the first actuator position and the second actuator position.

In any of the aspects or embodiments described above and herein, the memory may have instructions stored therein which, when executed by the controller, cause the controller to control the plurality of variable vanes based on at least the second calibrated position.

In any of the aspects or embodiments described above and herein, the memory may have instructions stored therein which, when executed by the controller, cause the controller to control the actuator to position the actuator member in the at least one predetermined position.

In any of the aspects or embodiments described above and herein, the at least one predetermined position may include a mid-stroke calibration position of the actuator member.

In any of the aspects or embodiments described above and herein, the at least one predetermined position may include a plurality of predetermined positions. The memory may have instructions stored therein which, when executed by the controller, cause the controller to determine the measured position difference for each predetermined position of the plurality of predetermined positions.

In any of the aspects or embodiments described above and herein, the memory may have instructions stored therein which, when executed by the controller, cause the controller to store the measured position difference in memory for each of the plurality of predetermined positions and calibrate the second channel of the position sensor by adjusting the second measured position by the measured position difference for one predetermined position of the plurality of predetermined positions which is closest to a current measured position of the actuator member.

In any of the aspects or embodiments described above and herein, the memory may have instructions stored therein which, when executed by the controller, cause the controller to calibrate the second channel of the position sensor when the measured position difference exceeds a predetermined difference threshold.

In any of the aspects or embodiments described above and herein, the controller may be configurable in an armed condition. The memory may have instructions stored therein which, when executed by the controller in the armed condition, cause the controller to perform one or more self-test functions including determining whether there is a fault associated with one or both of the actuator or the position sensor.

In any of the aspects or embodiments described above and herein, the memory may have instructions stored therein which, when executed by the controller in the armed condition, cause the controller to prevent calibrating the second channel when the fault is detected by the controller.

According to another aspect of the present disclosure, a gas turbine engine includes a rotatable shaft and a compressor including at least one rotor assembly mounted to the rotatable shaft and at least one stator assembly. The at least one stator assembly includes a variable vane assembly including a plurality of variable vanes disposed about an axial centerline. Each variable vane of the plurality of variable vanes is rotatable about a respective vane axis. The variable vane assembly further includes an actuator including an actuator member configured to rotate at least one variable vane of the plurality of variable vanes and a position sensor including a first position channel and a second position channel. The first position channel is configured to determine a first measured position of the actuator member and the second position channel is configured to determine a second measured position of the actuator member. The variable vane assembly further includes a controller in signal communication with the position sensor and the actuator. The controller includes memory having instructions stored therein which, when executed by the controller, cause the controller to determine the first measured position and the second measured position of the actuator member in at least one predetermined position of the actuator member, determine a measured position difference of the first measured position and the second measured position, and calibrate the second channel of the position sensor by adjusting the second measured position by the measured position difference to determine a second calibrated position.

In any of the aspects or embodiments described above and herein, the controller may be an electronic engine controller (EEC) for the gas turbine engine.

In any of the aspects or embodiments described above and herein, the memory may have instructions stored therein which, when executed by the controller, cause the controller to control the plurality of variable vanes based on at least the second calibrated position.

According to another aspect of the present disclosure, a method for calibrating a position sensor of a variable vane assembly for a gas turbine engine includes positioning an actuator member in at least one predetermined position, determining a first measured position of an actuator member in the at least one predetermined position with a first channel of a position sensor, determining a second measured position of the actuator member in the at least one predetermined position with a second channel of a position sensor, determining a measured position difference between the first measured position and the second measured position, and calibrating the second channel of the position sensor by adjusting the second measured position by the measured position difference to determine a second calibrated position.

In any of the aspects or embodiments described above and herein, the step of determining the first measured position of the actuator member with the first channel of the position sensor may be performed with the actuator member disposed at a most-accurate position of the actuator member, the at least one predetermined position including the most-accurate position.

In any of the aspects or embodiments described above and herein, the method may further include determining the most-accurate position of the actuator member.

In any of the aspects or embodiments described above and herein, the at least one predetermined position may include a plurality of predetermined positions. The step of determining the measured position difference may include determining the measured position difference for each predetermined position of the plurality of predetermined positions.

In any of the aspects or embodiments described above and herein, the method may further include storing the measured position difference in memory for each of the plurality of predetermined positions. The step of calibrating the second channel of the position sensor may include adjusting the second measured position by the measured position difference for one said predetermined position of the plurality of predetermined positions which is closest to a current measured position of the actuator member.

In any of the aspects or embodiments described above and herein, the step of calibrating the second channel may be performed when the measured position difference exceeds a predetermined difference threshold.

In any of the aspects or embodiments described above and herein, the steps of determining the first measured position, determining the second measured position, and determining the measured position difference may be performed as the actuator moves from a first actuator position to a second actuator position. The at least one predetermined position may be located between the first actuator position and the second actuator position.

The present disclosure, and all its aspects, embodiments and advantages associated therewith will become more readily apparent in view of the detailed description provided below, including the accompanying drawings.

DETAILED DESCRIPTION

Figure 1:
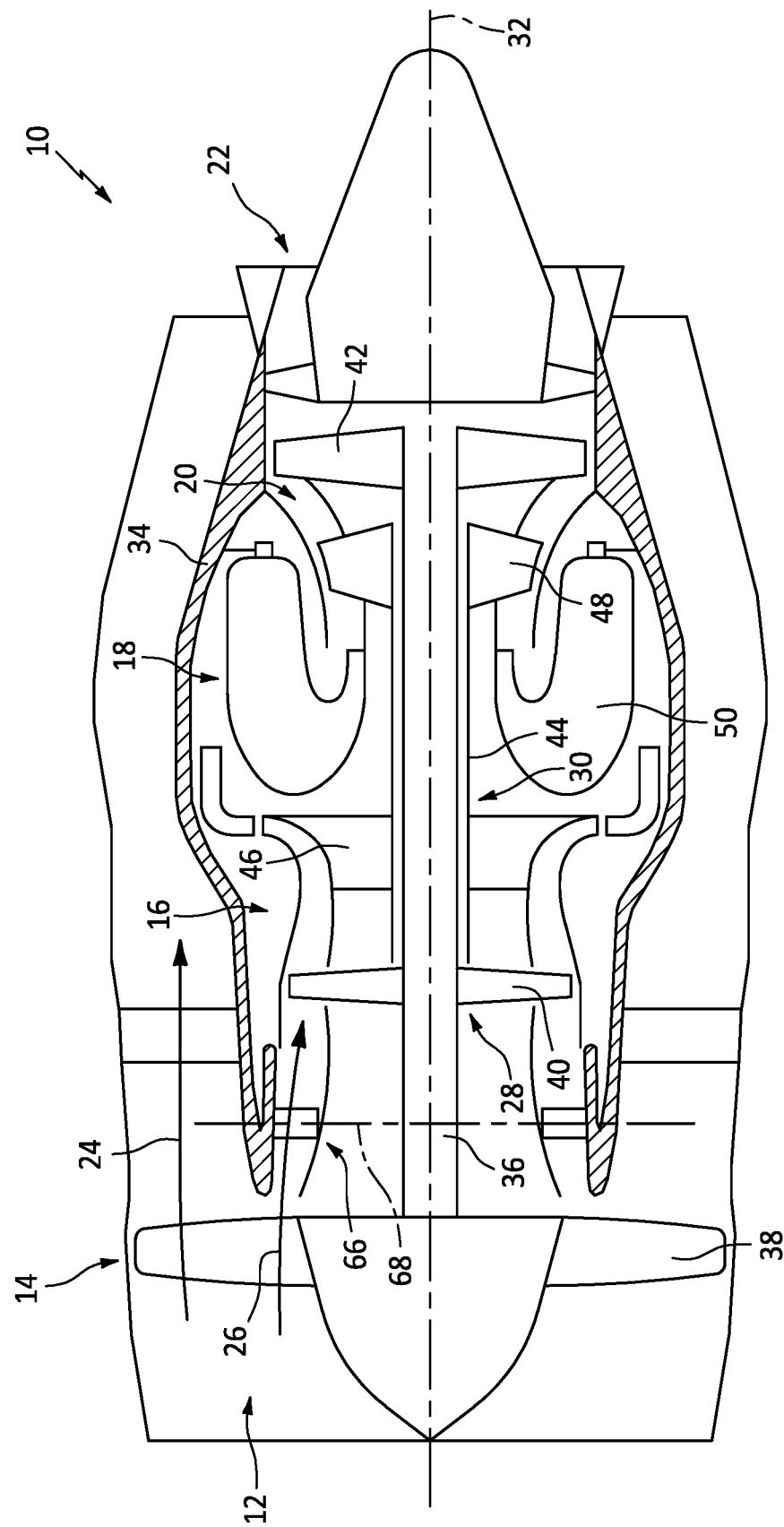
FIG. 1 illustrates a schematic cross-sectional view of a gas turbine engine, in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes an inlet 12, a fan section 14, a compressor section 16, a combustor section 18, a turbine section 20, and an exhaust section 22. The fan section 14 drives air along a bypass flow path 24 while the compressor section 16 drives air along a core flow path 26 for compression and communication into the combustor section 18 and then expansion through the turbine section 20. Although depicted as a turbofan gas turbine engine in the disclosed non-limiting embodiments, it should be understood that the concepts described herein are not limited to use with turbofans as the teachings may be applied to other types of gas turbine engines as well as other industrial equipment.

The gas turbine engine 10 of FIG. 1 includes a low-pressure spool 28 and a high-pressure spool 30 mounted for rotation about an axial centerline 32 (e.g., a rotational axis) of the gas turbine engine 10 relative to an engine static structure 34 (e.g., an engine case). The low-pressure spool 28 includes a low-pressure shaft 36 that interconnects a fan 38, a low-pressure compressor 40, and a low-pressure turbine 42. The high-pressure spool 30 includes a high-pressure shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the axial centerline 32. The low-pressure shaft 36 and the high-pressure shaft 44 are concentric and rotate about the axial centerline 32.

Airflow along the core flow path 26 is compressed by the low-pressure compressor 40, then the high-pressure compressor 46, mixed and burned with fuel in the combustor 50, and then expanded over the high-pressure turbine 48 and the low-pressure turbine 42. The low-pressure turbine 42 and the high-pressure turbine 48 rotationally drive the low-pressure spool 28 and the high-pressure spool 30, respectively, in response to the expansion.

Figure 2:
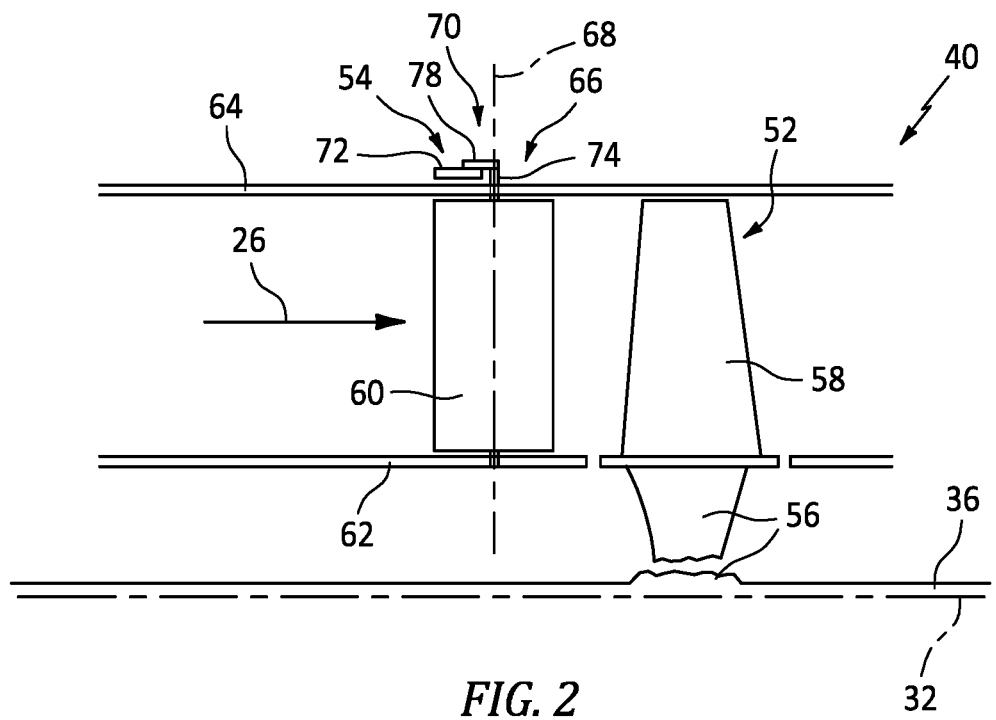
FIG. 2 illustrates perspective views of portions of a variable vane assembly, in accordance with one or more embodiments of the present disclosure.
Figure 4:
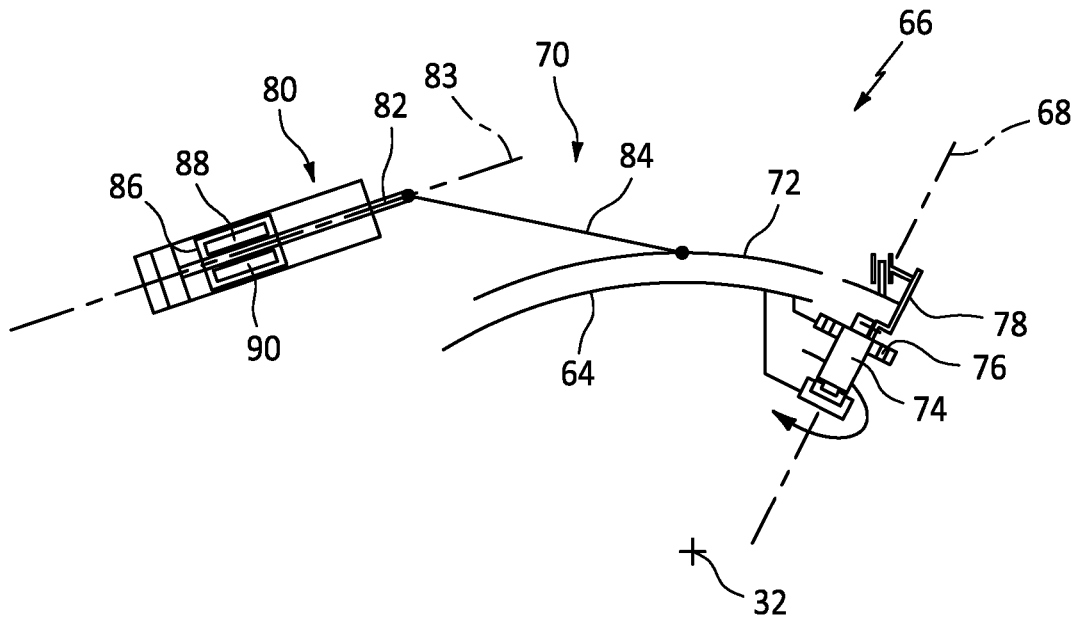
FIG. 4 illustrates a schematic view of a circumferential portion of a variable vane assembly, in accordance with one or more embodiments of the present disclosure.
Figure 3:
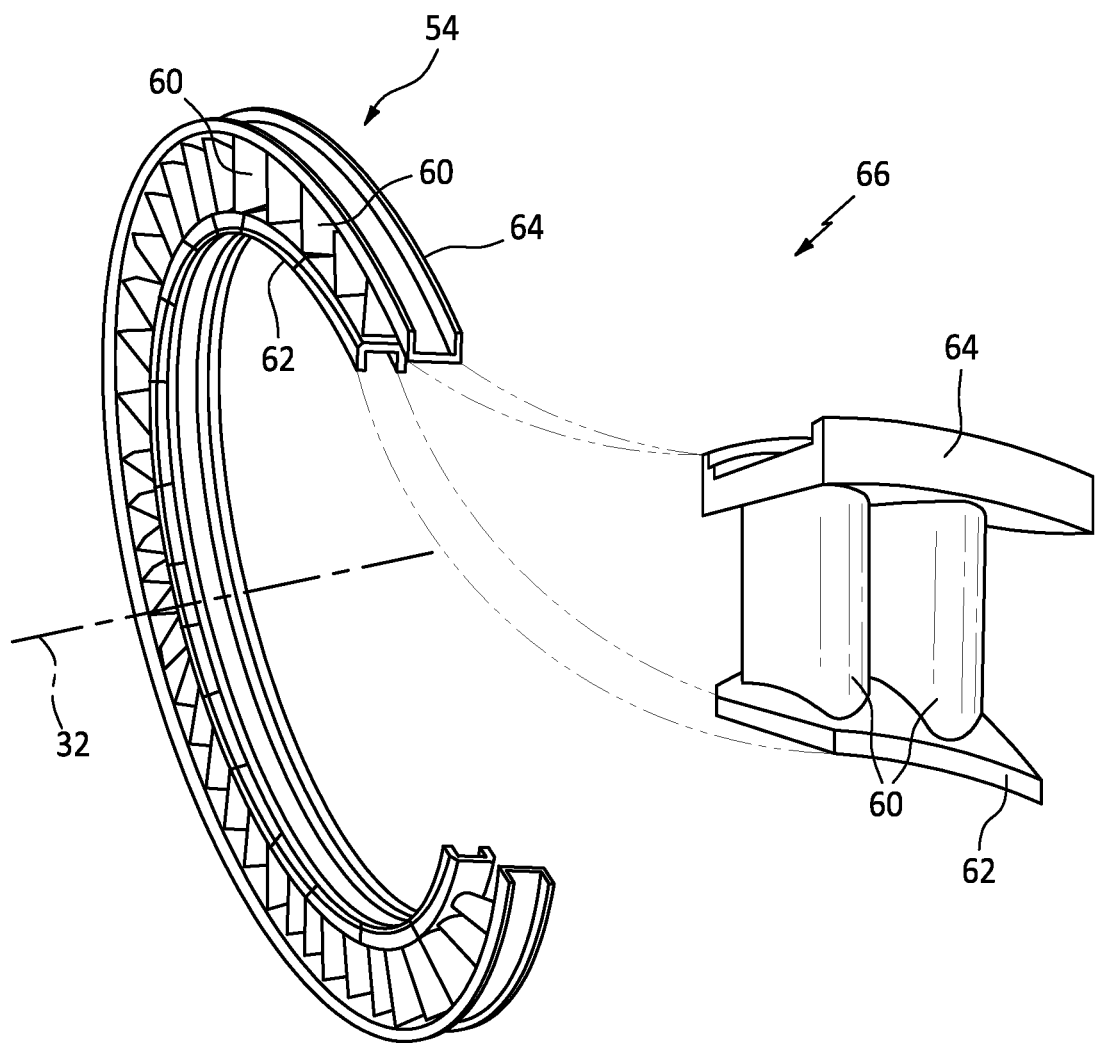
FIG. 3 illustrates a schematic cross-sectional view of a variable vane for a variable vane assembly, in accordance with one or more embodiments of the present disclosure.

Referring to FIGS. 2-4, the low-pressure compressor 40 may include alternating stages of one or more rotor assemblies 52 and one or more stator assemblies 54. FIG. 2 illustrates a side, cross-sectional view of one stator assembly 54 and one rotor assembly 52 positioned downstream of the stator assembly 54 with respect to a core fluid flow along the core flow path 26. Each rotor assembly 52 includes a disk 56 mounted to the low-pressure shaft 36. Each rotor assembly 52 includes a plurality of blades 58 coupled to and circumferentially spaced about the disk 56. The blades 58 project radially outward from the disk 56 into the core flow path 26. In operation, the disk 56 and respective blades 58 of each rotor assembly 52 are configured to rotate about the axial centerline 32. Each stator assembly 54 generally includes a plurality of vanes 60 located within the core flow path 26 and configured to direct core fluid toward downstream blades 58. FIG. 3 illustrates a circumferential arrangement of the plurality of vanes 60 for one stator assembly 54. The vanes 60 are circumferentially positioned relative to the axial centerline 32. The vanes 60 are coupled to and extend radially between an annular inner diameter (ID) case 62 and an annular outer diameter (OD) case 64 radially outward of the ID case 62. The vanes 60 are circumferentially spaced about the axial centerline 32. Each of the blades 58 and the vanes 60 may generally be referred to as an "airfoil."

At least one stator assembly 54 is configured as a variable vane assembly 66 with one or more of the vanes 60 of the variable vane assembly 66 configured as variable vanes. The term "variable vane," as used herein, refers to a vane 60 configured to rotate about a vane axis 68 defined through the vane 60. For example, vane axis 68 may generally extend in a direction between the ID case 62 and the OD case 64 (e.g., a radial direction). As such, the variable vane 60 may be rotated about the vane axis 68 to vary an angle of attack of the variable vane 60 relative to the core fluid flow along the core flow path 26.

The variable vane assembly 66 includes an actuation system 70 configured to effect positioning of each variable vane 60 to vary an angle of attack of each variable vane 60 relative to airflow along the core flow path 26. FIG. 4 illustrates a schematic view of a circumferential portion of the variable vane assembly 66 and actuation system 70 for one variable vane, such as the variable vane 60 shown in FIG. 2. The actuation system 70 of FIGS. 2 and 4 includes a unison ring 72 disposed about the axial centerline 32. The unison ring 72 of FIGS. 2 and 4 is positioned radially outside the outer diameter case 64. The unison ring 72 is configured for rotation about the axial centerline 32. Each variable vane 60 of the variable vane assembly 66 is operably connected to the unison ring 72. Each variable vane 60 may include an outer diameter trunnion 74 rotatable mounted to the outer diameter case 64. The outer diameter trunnion 74 may be supported by one or more bushings 76 mounted to the outer diameter case 64. The outer diameter trunnion 74 of each variable vane 60 may be connected to the unison ring 72 by a respective arm 78. As shown in FIG. 4, the arm 78 may be rotatably mounted to the unison ring 72 and fixedly mounted to the outer diameter trunnion 74 of a respective one of the variable vanes 60. However, the present disclosure is not limited to this particular configuration of the arm 78 or operation interface between the variable vanes 60 and the unison ring 72. Rotation of the unison ring 72 about the axial centerline 32 effects rotation of the arm 78, thereby causing the respective variable vane 60 to rotate about the respective vane axis 68.

The actuation system 70 includes an actuator 80 configured to control rotation of the unison ring 72 about the axial centerline 32. The actuator 80 includes an actuator member 82 configured for movement by the actuator 80. As shown in FIG. 4, the actuator member 82 may be a piston configured for linear translation within the actuator 80 along a translation axis 83. However, the present disclosure is not limited to this particular configuration of the actuator member 82 and the actuator member 82 may alternatively be configured as a rotor, a gear assembly, or other suitable component or component assembly for effecting rotation of the unison ring 72 about the axial centerline 32. The actuator member 82 of FIG. 4 is connected to the unison ring 72 by a rod 84 (e.g., a dog-bone rod). The rod 84 may be rotatably connected to one or both of the actuator member 82 and the unison ring 72. Linear actuation of the actuator member 82 of FIG. 4 by the actuator 80 effects rotation of the unison ring 72 via the rod 84, thereby controlling the positions of the variable vanes 60 operably connected to the unison ring 72. The actuator member 82 may be positionable in a plurality of positions by the actuator 70. For example, the actuator member 82 of FIG. 4 may be positionable in a plurality of linear positions including a minimum position (e.g., a fully retracted position), a maximum position (e.g., a fully extended position), and a plurality of linear positions therebetween. Examples of suitable actuators for the actuator 70 may include, but are not limited to, electric motors (e.g., torque motors), hydraulic actuators, electro-mechanical actuators, pneumatic actuators, and the like, and the present disclosure is not limited to any particular configuration of the actuator 70.

Figure 5:
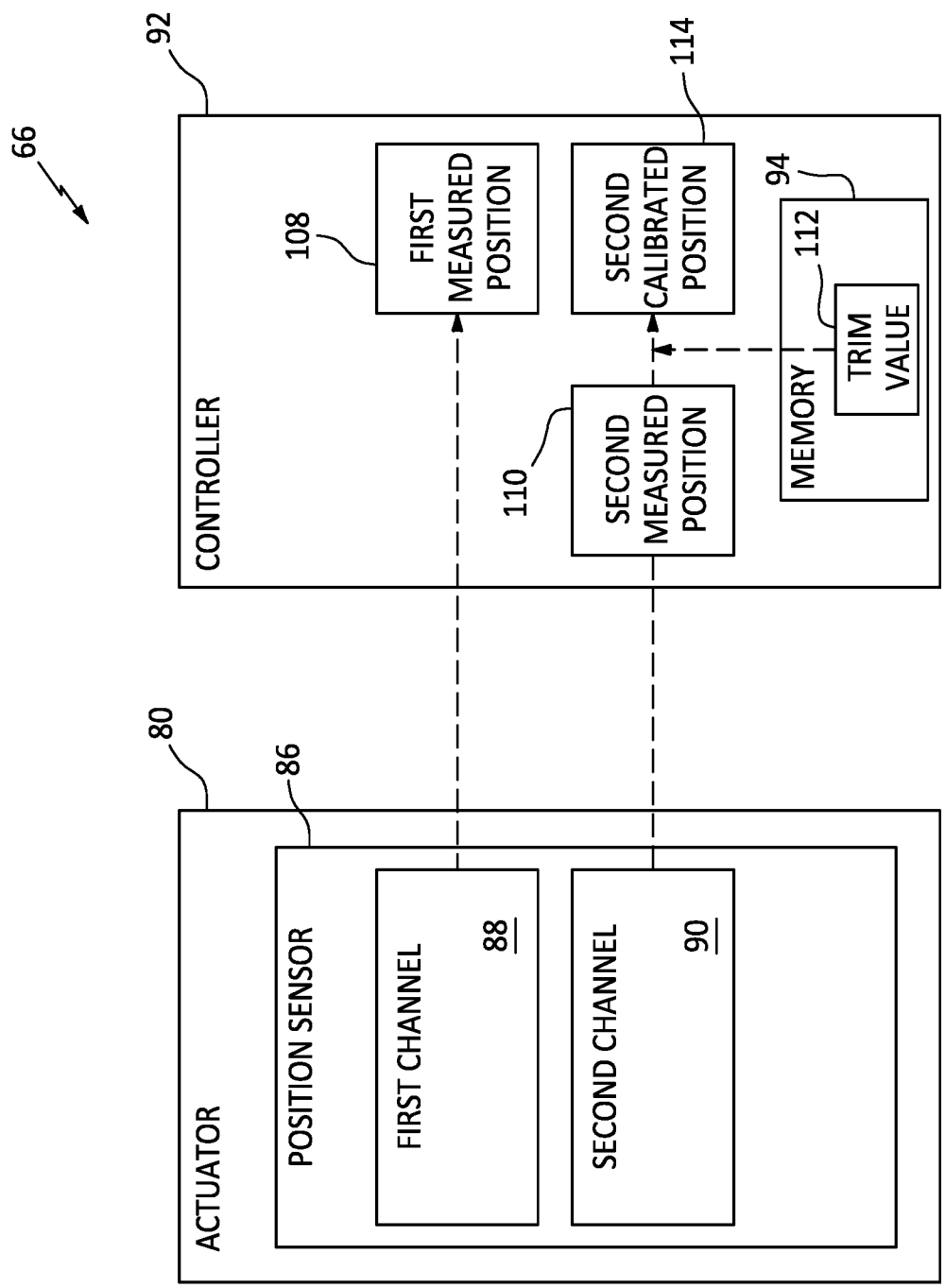
FIG. 5 illustrates a block diagram of a portion of a variable vane assembly, in accordance with one or more embodiments of the present disclosure.
Figure 6:
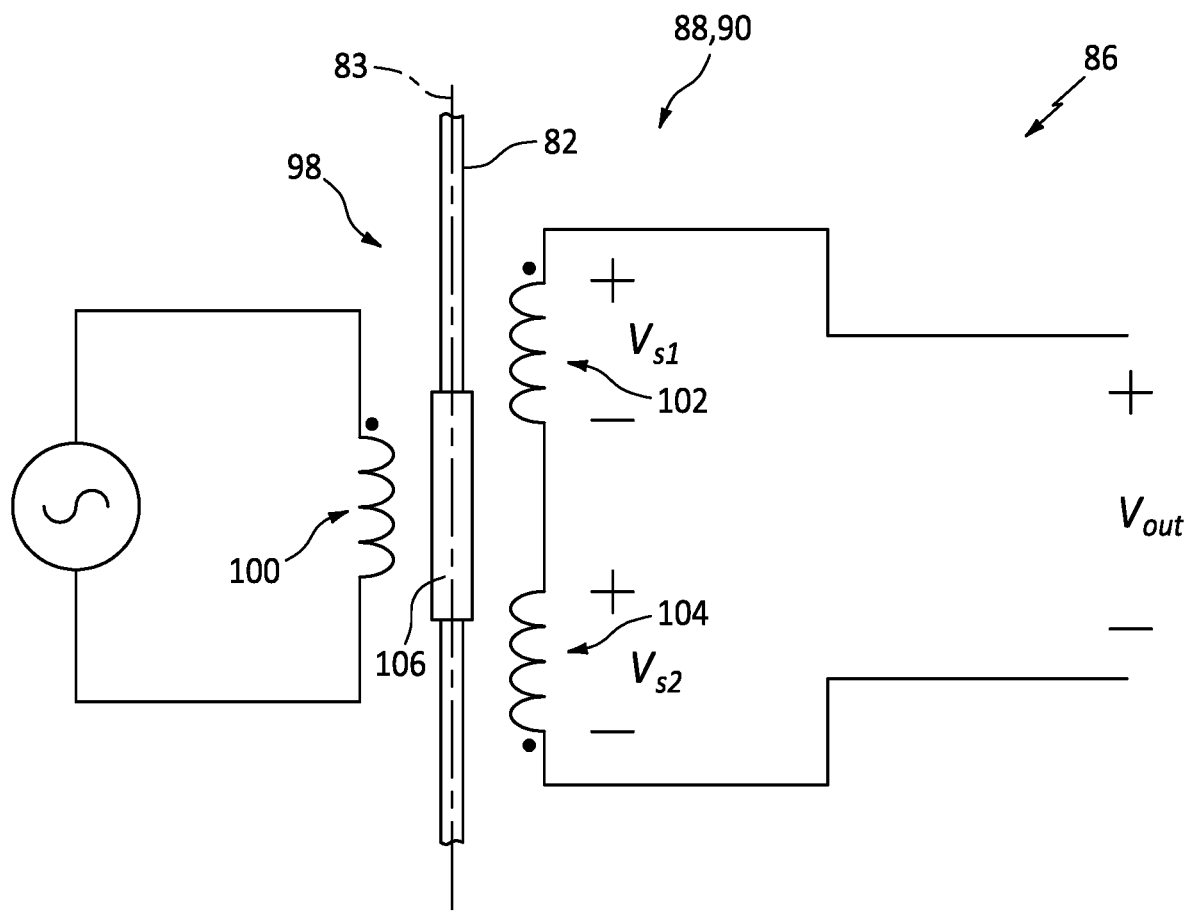
FIG. 6 illustrates a schematic view of an exemplary position sensor channel for a variable vane assembly, in accordance with one or more embodiments of the present disclosure.

Referring to FIGS. 4-6, the variable vane assembly 66 includes at least one position sensor 86 for the actuator member 82. The position sensor 86 may include one or more channels, with each channel configured to independently measure a position of the actuator member 82. For example, the position sensor 86 of FIGS. 4 and 5 includes a first channel 88 and a second channel 90. In some embodiments, the position sensor 86 may be a component of the actuator 80 and all or a substantial portion of the position sensor 86 may be located within the actuator 80. In some other embodiments, the position sensor 86 may be located outside of the actuator 80. Examples of the position sensor 86 may include, but are not limited to, potentiometers, linear variable differential transformers (LVDTs), rotary variable differential transformers (RVDTs), capacitive sensors, lead screw position indicators, etc., and the present disclosure is not limited to any particular configuration of the position sensor 86. Embodiments of the present disclosure are described herein in terms of a single position sensor 86.

Alternative embodiments may include a plurality of position sensors that collectively operate in the manner described herein.

FIG. 6 illustrates an exemplary configuration of a portion of one or both of the channels 88, 90 for the position sensor 86. The channel 88, 90 of FIG. 6 is configured as an LVDT 98 which converts a position or linear displacement of the actuator member 82 from a mechanical reference (e.g., a zero or null position) into a proportional electrical signal containing phase and amplitude information. The LVDT 98 of FIG. 6 includes a primary coil 100, a first secondary coil 102, and a second secondary coil 104. The actuator member 82 includes a core 106 (e.g., a ferromagnetic core) which translates along the translation axis 83, between the primary coil 100 and the secondary coils 102, 104, as the actuator member 82 translates. An alternating current (AC) applied to the primary coil 100 induces a first secondary voltage $V_{S1}$ in the first secondary coil 102 and a second secondary voltage $V_{S2}$ in the second secondary coil 104, which secondary voltages $V_{S1}$, $V_{S2}$ vary proportionally based on the position of the core 106 relative to the coils 100, 102, 104. As the core 106 translates along the translation axis 83, the primary coil's 100 linkage to the secondary coils 102, 104 changes, causing the induced voltage in each of the secondary coils 102, 104 to change. The secondary coils 102, 104 are electrically connected so that the output voltage $V_{OUT}$ is the difference between the first secondary voltage $V_{S1}$ and the second secondary voltage $V_{S2}$. The output voltage $V_{OUT}$ of the LVDT 98 may be used by the channel 88, 90 of the position sensor 86 to determine a measured position of the actuator member 82. In some embodiments, for example, the output voltage $V_{OUT}$ of the LVDT 98 may be used by the respective channel 88, 90 of the position sensor 86 to determine the measured position of the actuator member 82. The first channel 88 may determine a first measured position 108 of the actuator member 82 while the second channel 90 may determine a second measured position 110 of the actuator member 82. In some other embodiments, the output voltage $V_{OUT}$ of the LVDT 98 may be used by control circuitry external to the position sensor 86 to determine the measured position of the actuator member 82.

The variable vane assembly 66 may further include a controller 92 (see FIG. 5). The controller 92 may be in signal communication with the position sensor 86, the actuator 70, and/or one or more other systems of the gas turbine engine 10. The controller 92, for example, may effect closed-loop control of the actuator 70 based on measured positions of the actuator member 82 provided by the position sensor 86. In some embodiments, for example, the controller 92 may be an electronic engine controller (EEC) for the gas turbine engine 10. The EEC may control operating parameters of the gas turbine engine 10 including, but not limited to, fuel flow, stator vane position, compressor air bleed valve position, etc. so as to control an engine power and/or thrust of the gas turbine engine 10. In some embodiments, the EEC may be part of a full authority digital engine control (FADEC) system for the gas turbine engine 10. The controller 92 may include any type of computing device, computational circuit, or any type of process or processing circuit capable of executing a series of instructions that are stored in memory 94, thereby causing the controller 92 to perform one or more steps or other processes. The controller 92 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 94 may represent one or more algorithms for controlling the aspects of the variable vane assembly 66, and the stored instructions are not limited to any particular form (e.g., program files, system data, buffers, drivers, utilities, system programs, etc.) provided they can be executed by the controller 92. The memory 94 may be a non-transitory computer readable storage medium configured to store instructions that when executed by one or more processors, cause the one or more processors to perform or cause the performance of certain functions. The memory 94 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 92 may be achieved via the use of hardware, software, firmware, or any combination thereof. The controller 92 may also include input and output devices 96 ((e.g., keyboards, buttons, switches, touch screens, video monitors, sensor readouts, data ports, etc.) that enable the operator to input instructions, receive data, etc.

Position sensors, such as the position sensor 86 for the actuator 70, may have varying states of calibration for one or more channels, such as the channels 88, 90, of the position sensors. With reference to the above-described position sensor 86, in one example, the first channel 88 may be calibrated to accurately determine the position of the actuator member 82 of the actuator 70 while the second channel 90 may not be calibrated or may be insufficiently calibrated to accurately determine the position of the actuator member 82 for the intended use of the actuator 70. For example, the first measured position 108 of the actuator member 82 determined by the first channel 88 may differ from the second measured position 110 of the actuator member 82 determined by the second channel 90 by greater than one percent (1%) of the travel distance of the actuator member 82 between the maximum position and the minimum position of the actuator member 82. For further example, the first measured position 108 of the actuator member 82 determined by the first channel 88 may differ from the second measured position 110 of the actuator member 82 determined by the second channel 90 by greater than two percent (2%) of the travel distance of the actuator member 82 between the maximum position and the minimum position of the actuator member 82. For further example, the first measured position 108 of the actuator member 82 determined by the first channel 88 may differ from the second measured position 110 of the actuator member 82 determined by the second channel 90 by greater than four percent (4%) of the travel distance of the actuator member 82 between the maximum position and the minimum position of the actuator member 82.

Figure 7:
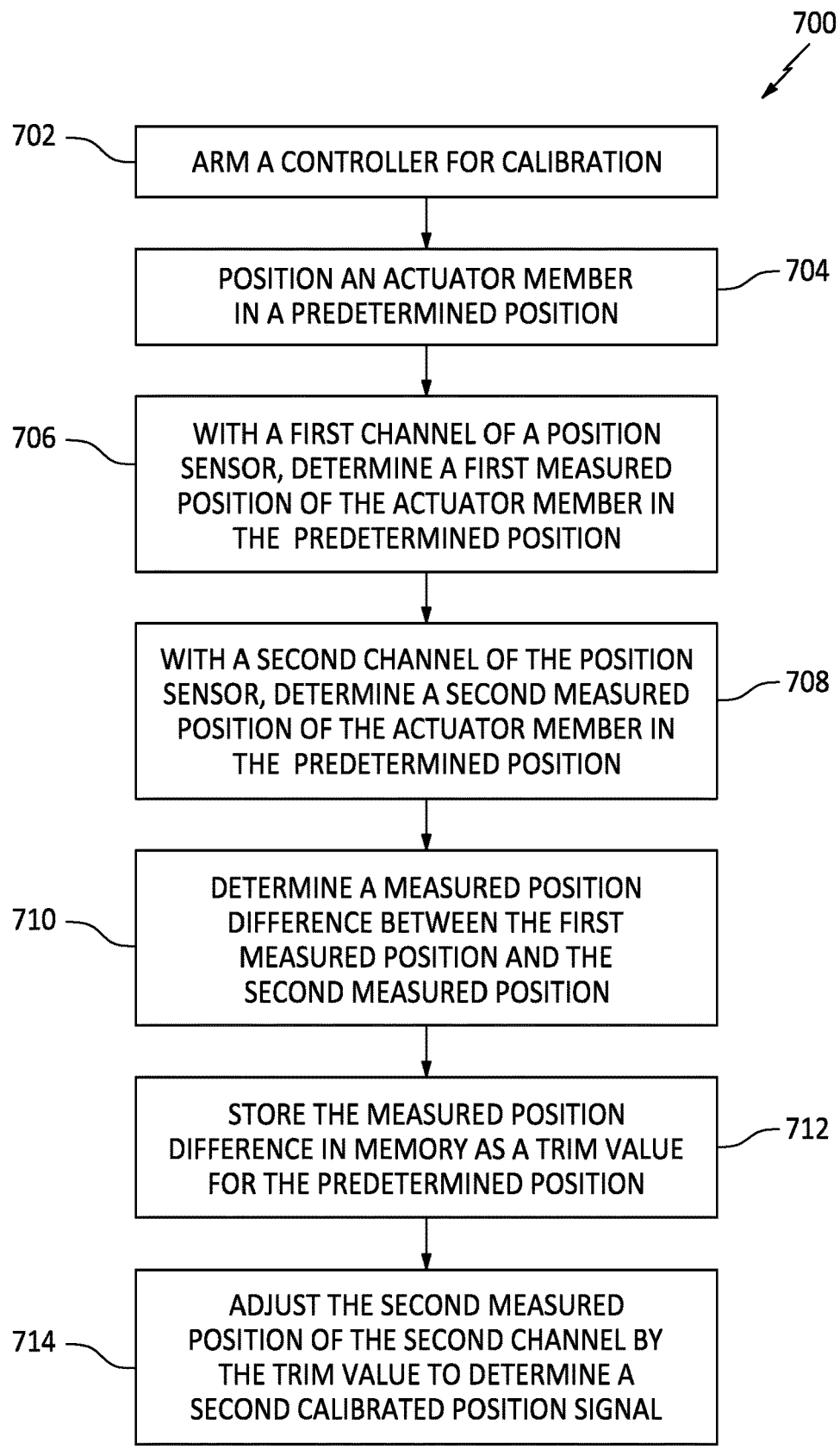
FIG. 7 illustrates a block diagram of a method for calibrating a position sensor of a variable vane assembly for a gas turbine engine, in accordance with one or more embodiments of the present disclosure.

Referring to FIGS. 4-7, a method 700 for calibrating a position sensor of a variable vane assembly is provided. FIG. 7 illustrates a flowchart of the method 700. For ease of description, the method 700 is described below with reference to the variable vane assembly 66 including the actuator 70, position sensor 86, and controller 92. For example, the controller 92 may execute instructions stored in memory 94, thereby causing the controller 92 to perform one or more steps of the method 700. The method 700, however, may alternatively be performed with other actuator systems or variable vane assemblies. Unless otherwise noted herein, it should be understood that the steps of method 700 are not required to be performed in the specific sequence in which they are discussed below and, in various embodiments, the steps of method 700 may be performed separately or simultaneously.

In Step 702, the method 700 may optionally include arming the controller 92 for a calibration process. The controller 92 may be configured to operate in a variety of operational modes (e.g., normal mode, test mode, maintenance mode, etc.) which may determine what actions the controller 92 can perform. Arming the controller 92 for a calibration process may include placing the controller 92 in a maintenance operational mode. In the armed condition, the controller 92 may perform one or more self-test functions, for example, to determine whether there are any faults associated with the actuator 70, position sensor 86, variable vane assembly 66, and/or the controller 92 itself. The controller 92 may continuously perform the one or more self-test functions in one or more steps of the method 700. If a fault is detected, the controller 92 may be configured to prevent a calibration process from proceeding in order to prevent a position sensor channel, such as the second channel 90, from being calibrated using potentially corrupted calibration data. Arming the controller 92 for the calibration procedure may additionally include confirmation by an operator. For example, the operator may be required to physically confirm that the calibration procedure should proceed (e.g., by interacting with a switch, button, etc. of the input/output devices 96 for the controller 92).

In Step 704, the controller 92 may control the actuator 80 to position the actuator member 82 in a predetermined position. The predetermined position may correspond to a known position of the actuator member 82 in which the first channel 88 and/or the second channel 90 exhibit the greatest accuracy. Accuracy of the first channel 88 and the second channel 90, with regard to measurement of the actuator member 82 position, may vary along the range of travel of the actuator member 82 between the maximum position and the minimum position of the actuator member 82. As an example, with reference to FIG. 6, in one or more positions or position ranges of the actuator member 82, the first channel 88 and/or the second channel 90 may exhibit a greater change in output voltage $V_{OUT}$ (e.g., an actuator member 82 position signal) relative to a change in actuator member 82 position, in comparison to one or more other positions or position ranges of the actuator member 82. In other words, in one or more positions or position ranges of the actuator member 82, the first channel 88 and/or the second channel 90 may be more sensitive to changes in the position of the actuator member 82. Those positions or position ranges of the actuator member 82 which demonstrate a greater sensitivity to actuator member 82 movement may also provide a more accurate position for measuring a position of the actuator member 82 with the first channel 88 and/or the second channel 90. Positions or position ranges of the actuator member 82 which provide the greatest accuracy or greater accuracy relative to other positions or position ranges of the actuator member 82 may be known (e.g., may be provided by the manufacturer of the actuator 80. Alternatively, the positions or position ranges of the actuator member 82 which provide the greatest accuracy or greater accuracy relative to other positions or position ranges of the actuator member 82 may be determined, for example, by comparing a measured position of the actuator member 82 or output signal provided by the first channel 88 and/or the second channel 90 to a measured position of the actuator member 82 provided by a test device such as, but not limited to, a dial indicator, a laser measurement system, etc. In some embodiments, the predetermined position for the actuator member 82 may be a mid-stroke position of the actuator member 82. The mid-stroke position may be substantially halfway (e.g., substantially an equal distance from) the maximum position and the minimum position of the actuator member 82. The mid-stroke position of the actuator member 82 may correspond to a most-accurate position of the first channel 88 with respect to the first measured position 108 of the actuator member 82. However, the predetermined position and/or the most-accurate calibration position for the actuator member 82 is not limited to the mid-stroke position of the actuator member 82 and alternative and/or additional positions of the actuator member 82 may be used in Step 704.

In Step 706, the first channel 88 of the position sensor 86 may determine the first measured position 108 of the actuator member 82 in the predetermined position. Similarly, in Step 708, the second channel 90 may determine the second measured position 110 of the actuator member 82 in the predetermined position. As previously discussed, the first channel 88 of the position sensor 86 may have a different degree of calibration in contrast to the second channel 90 of the position sensor 86. Accordingly, there may be a substantial difference between the first measured position 108 and the second measured position 110 with the actuator member 82 in the predetermined position. The position sensor 86 provides the first measured position 108 and the second measured position 110 to the controller 92 as measured position signals.

In Step 710, the controller 92 determines a difference between the first measured position 108 and the second measured position 110. In Step 712, the measured position difference may be stored in memory 94 as a trim value 112 for the particular predetermined position of the actuator member 82 associated with the first measured position 108 and the second measured position 110. In some embodiments, Steps 704, 706, 708, 710, and 712 may be repeated for a plurality of predetermined positions for the actuator member 82 along the range of actuator member 82 movement. Accordingly, a plurality of trim values 112 may be stored in memory 94 with each trim value 112 of the plurality of trim values 112 corresponding to a particular predetermined position of the actuator member 82. In some embodiments, Steps 706, 708, 710, and 712 may be performed automatically by the controller 92. Accordingly, the calibration process of Steps 706, 708, 710, 712 may be performed periodically during variable vane assembly 66 operation and with or without operator input. For example, the calibration process of Steps 706, 708, 710, 712 may be performed automatically when the first measured position 108 is within a threshold distance of the predetermined position for the actuator member 82. A threshold distance of the predetermined position for the actuator member 82 may be, for example, five percent (5%) of the travel distance of the actuator member 82 between the maximum position and the minimum position of the actuator member 82, or for example, three percent (3%) of the travel distance of the actuator member 82 between the maximum position and the minimum position of the actuator member 82, or for example, one percent (1%) of the travel distance of the actuator member 82 between the maximum position and the minimum position of the actuator member 82. The calibration process of Steps 706, 708, 710, 712 may be performed automatically as the actuator member 82 is moved or otherwise positioned during operation or testing of the variable vane assembly 66. For example, the actuator 80 may be operated to move the actuator member 82 from a first position to a second position. The predetermined position for determining a difference between the first measured position 108 and the second measured position 110 may be located between the first position and the second position. Accordingly, the controller 92 may perform the calibration process of Steps 706, 708, 710, 712 as the actuator member 82 moves through the predetermined position or within a threshold distance of the predetermined position, while moving from the first position to the second position.

In Step 714, the controller 92 is configured to calibrate the second channel 90 by adjusting the second measured position 110 by the trim value 112 (i.e., the measured position difference determined in Step 710) to determine a second calibrated position 114 of the actuator member 82. In other words, the trim value 112 may be added to the second measured position 110 such that the resultant second calibrated position 114 is approximately the same as the first measured position 108 provided by the first channel 88. Where multiple trim values 112 are stored in memory 94, the controller 92 may apply the trim value 112 for the predetermined position which is closest to the current measured position (e.g., the first measured position 108 and/or the second measured position 110) of the actuator member 82. During operation of the gas turbine engine 10, the controller 92 may use the first measured position 108 provided by the first channel 88 of the position sensor 86 and the second calibrated position 114 determined by the controller 92 to control the positions of the variable vanes 60 of the variable vane assembly 66 using the actuator 80.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A variable vane assembly for a gas turbine engine, the variable vane assembly comprising:
   a plurality of variable vanes disposed about an axial centerline, each variable vane of the plurality of variable vanes rotatable about a respective vane axis;
   an actuator including an actuator member configured to rotate at least one variable vane of the plurality of variable vanes, the actuator member positionable in a plurality of actuator positions to rotate the at least one variable vane;
   a position sensor including a first position channel and a second position channel, the first position channel configured to determine a first measured position of the actuator member in the plurality of actuator positions, the second position channel configured to determine a second measured position of the actuator member in the plurality of actuator positions, and the first position channel and the second position channel are configured to independently determine the first measured position and the second measured position, respectively; and
   a controller in signal communication with the position sensor and the actuator, the controller including memory having instructions stored therein which, when executed by the controller, cause the controller to:
      position the actuator member in a first predetermined actuator position, the first predetermined actuator position is one of the plurality of actuator positions;
      determine the first measured position of the actuator member at the first predetermined actuator position with the first position channel and determine the second measured position of the actuator member at the first predetermined actuator position with the second position channel;
      determine a first measured position difference between the first measured position at the first predetermined actuator position and the second measured position at the first predetermined actuator position; and
      calibrate the second channel of the position sensor by adjusting the second measured position using the first measured position difference to determine a second calibrated position of the second position channel for the plurality of actuator positions.

2. The variable vane assembly of claim 1, wherein the memory has instructions stored therein which when executed by the controller, cause the controller to determine the first measured position, determine the second measured position, and determine the first measured position difference automatically as the actuator member moves from a first actuator position to a second actuator position, the first predetermined actuator position located between the first actuator position and the second actuator position.

3. The variable vane assembly of claim 1, wherein the memory has instructions stored therein which, when executed by the controller, cause the controller to control the plurality of variable vanes based on at least the second calibrated position.

4. The variable vane assembly of claim 1, wherein the first predetermined actuator position is a mid-stroke calibration position of the actuator member.

5. The variable vane assembly of claim 1, wherein the memory has instructions stored therein which, when executed by the controller, cause the controller to:
position the actuator member in a second predetermined actuator position, the second predetermined actuator position is one of the plurality of actuator positions different than the first predetermined actuator position;
determine the first measured position of the actuator member at the second predetermined actuator position with the first position channel and determine the second measured position of the actuator member at the second predetermined actuator position with the second position channel;
determine a second measured position difference between the first measured position at the second predetermined actuator position and the second measured position at the second predetermined actuator position; and
calibrate the second channel of the position sensor by adjusting the second measured position using the first measured position difference and the second measured position difference to determine, with the second position channel, the second calibrated position of the second position channel for the plurality of actuator positions.

6. The variable vane assembly of claim 1, wherein the memory has instructions stored therein which, when executed by the controller, cause the controller to:
position the actuator member in a second predetermined actuator position, the second predetermined actuator position is one of the plurality of actuator positions different than the first predetermined actuator position;
determine the first measured position of the actuator member at the second predetermined actuator position with the first position channel and determine the second measured position of the actuator member at the second predetermined actuator position with the second position channel;
determine a second measured position difference between the first measured position at the second predetermined actuator position and the second measured position at the second predetermined actuator position; and
calibrate the second channel of the position sensor by adjusting the second measured position using:
the first measured position difference where a current actuator position of the actuator member is closer to the first predetermined actuator position than the second predetermined actuator position; or
the second measured position difference where the current actuator position of the actuator member is closer to the second predetermined actuator position than the first predetermined actuator position.

7. The variable vane assembly of claim 1, wherein the memory has instructions stored therein which, when executed by the controller, cause the controller to:
determine the first measured position difference exceeds a predetermined difference threshold; and
calibrate the second channel of the position sensor in response to determining the first measured position difference exceeds the predetermined difference threshold.

8. A gas turbine engine comprising:
a rotatable shaft; and
a compressor including at least one rotor assembly mounted to the rotatable shaft and at least one stator assembly, the at least one stator assembly including a variable vane assembly comprising:
a plurality of variable vanes disposed about an axial centerline, each variable vane of the plurality of variable vanes rotatable about a respective vane axis;
an actuator including an actuator member configured to rotate at least one variable vane of the plurality of variable vanes, the actuator member positionable in a plurality of actuator positions to rotate the at least one variable vane;
a position sensor including a first position channel and a second position channel, the first position channel configured to determine a first measured position of the actuator member in the plurality of actuator positions, the second position channel configured to determine a second measured position of the actuator member in the plurality of actuator positions; and
a controller in signal communication with the position sensor and the actuator, the controller including memory having instructions stored therein which, when executed by the controller, cause the controller to:
position the actuator member in a first predetermined actuator position, the first predetermined actuator position is one of the plurality of actuator positions;
determine the first measured position of the actuator member at the first predetermined position with the first position channel and determine the second measured position of the actuator member at the first predetermined actuator position with the second position channel;
determine a first measured position difference between the first measured position at the first predetermined actuator position and the second measured position at the first predetermined actuator position; and
calibrate the second channel of the position sensor by adjusting the second measured position using the first measured position difference to determine a second calibrated position of the second position channel for the plurality of actuator positions.

9. The gas turbine engine of claim 8, wherein the controller is an electronic engine controller (EEC) for the gas turbine engine.

10. The gas turbine engine of claim 8, wherein the memory has instructions stored therein which, when executed by the controller, cause the controller to control the plurality of variable vanes based on at least the second calibrated position.

11. A method for calibrating a position sensor of a variable vane assembly for a gas turbine engine, the method comprising:

positioning an actuator member in a first predetermined actuator position, the actuator member positionable in a plurality of actuator positions including the first predetermined actuator position;

determining a first measured position of the actuator member in the first predetermined actuator position with a first channel of a position sensor;

determining a second measured position of the actuator member in the first predetermined actuator position with a second channel of the position sensor;

determining a first measured position difference between the first measured position at the first predetermined actuator position and the second measured position at the first predetermined actuator position; and calibrating the second channel of the position sensor by adjusting the second measured position using the first measured position difference to determine a second calibrated position of the second position channel for the plurality of actuator positions.

12. The method of claim 11, further comprising:

positioning the actuator member in a second predetermined actuator position, the second predetermined actuator position is one of the plurality of actuator positions different than the first predetermined actuator position;

determining the first measured position of the actuator member at the second predetermined actuator position with the first position channel and determining the second measured position of the actuator member at the second predetermined actuator position with the second position channel;

determining a second measured position difference between the first measured position at the second predetermined actuator position and the second measured position at the second predetermined actuator position; and calibrating the second channel of the position sensor by adjusting the second measured position using the first measured position difference and the second measured position difference to determine, with the second position channel, the second calibrated position of the second position channel for the plurality of actuator positions.

13. The method of claim 11, further comprising:

positioning the actuator member in a second predetermined actuator position, the second predetermined actuator position is one of the plurality of actuator positions different than the first predetermined actuator position;

determining the first measured position of the actuator member at the second predetermined actuator position with the first position channel and determine the second measured position of the actuator member at the second predetermined actuator position with the second position channel;

determining a second measured position difference between the first measured position at the second predetermined actuator position and the second measured position at the second predetermined actuator position; and calibrating the second channel of the position sensor by adjusting the second measured position using:

the first measured position difference where a current actuator position of the actuator member is closer to the first predetermined actuator position than the second predetermined actuator position; or the second measured position difference where the current actuator position of the actuator member is closer to the second predetermined actuator position than the first predetermined actuator position.

14. The method of claim 11, further comprising determining the first measured position difference exceeds a predetermined difference threshold, wherein the step of calibrating the second channel of the position sensor is performed in response to determining the first measured position difference exceeds the predetermined difference threshold.

15. The method of claim 11, wherein the steps of determining the first measured position, determining the second measured position, and determining the measured position difference are performed as the actuator member moves from a first actuator position to a second actuator position, the first predetermined actuator position located between the first actuator position and the second actuator position.

* * * * *